US010399546B2

(12) United States Patent
Drotleff

(10) Patent No.: US 10,399,546 B2
(45) Date of Patent: Sep. 3, 2019

(54) ELECTRONICALLY SLIP-CONTROLLABLE POWER-ASSISTED BRAKING SYSTEM, IN PARTICULAR FOR A MOTOR VEHICLE

(71) Applicant: Robert Bosch GmbH, Stuttgart (DE)

(72) Inventor: Dirk Drotleff, Oberstenfeld-Gronau (DE)

(73) Assignee: Robert Bosch GmbH, Stuttgart (DE)

(*) Notice: Subject to any disclaimer, the term of this patent is extended or adjusted under 35 U.S.C. 154(b) by 72 days.

(21) Appl. No.: 15/187,501

(22) Filed: Jun. 20, 2016

(65) Prior Publication Data

US 2016/0368468 A1    Dec. 22, 2016

(30) Foreign Application Priority Data

Jun. 22, 2015 (DE) .................. 10 2015 211 430

(51) Int. Cl.
| | |
|---|---|
| *B60T 8/176* | (2006.01) |
| *B60T 13/16* | (2006.01) |
| *B60T 7/04* | (2006.01) |
| *B60T 13/66* | (2006.01) |
| *B60T 13/68* | (2006.01) |
| *B60T 15/24* | (2006.01) |
| *B60T 8/40* | (2006.01) |
| *B60T 8/44* | (2006.01) |

(52) U.S. Cl.
CPC .............. *B60T 8/176* (2013.01); *B60T 7/042* (2013.01); *B60T 8/4072* (2013.01); *B60T 8/441* (2013.01); *B60T 8/445* (2013.01); *B60T 13/166* (2013.01); *B60T 13/662* (2013.01); *B60T 13/686* (2013.01); *B60T 15/24* (2013.01)

(58) Field of Classification Search
CPC ........ B60T 8/176; B60T 8/4072; B60T 8/441; B60T 8/445; B60T 7/042; B60T 13/166; B60T 15/24
See application file for complete search history.

(56) References Cited

U.S. PATENT DOCUMENTS

| | | | | |
|---|---|---|---|---|
| 3,667,815 | A * | 6/1972 | Zoppi ..................... | B60T 13/36 188/3 R |
| 4,589,706 | A * | 5/1986 | Leiber ................... | B60T 8/4836 188/181 R |
| 4,693,521 | A * | 9/1987 | Takata .................. | B60T 8/3265 303/115.4 |
| 4,729,611 | A * | 3/1988 | Kircher .................. | B60T 8/445 188/358 |
| 4,826,255 | A * | 5/1989 | Volz ...................... | B60T 8/4031 188/345 |

(Continued)

*Primary Examiner* — Bradley T King
*Assistant Examiner* — James K Hsiao
(74) *Attorney, Agent, or Firm* — Norton Rose Fulbright US LLP; Gerard Messina

(57) ABSTRACT

An electronically slip-controllable power-assisted braking system for a motor vehicle. The power-assisted braking system is equipped with a hydraulically acting booster device that is inserted in a brake circuit downstream from an actuation device and has a piston unit movably guided in a cylinder housing. The piston unit is embodied in stepped fashion and divides an interior space of the cylinder housing into multiple booster chambers impinged upon by pressure medium. At least one of these booster chambers is capable of being impinged upon by pump pressure from a pump driven by external force.

22 Claims, 2 Drawing Sheets

(56) References Cited

U.S. PATENT DOCUMENTS

| | | | | |
|---|---|---|---|---|
| 5,141,295 A * | 8/1992 | Burgdorf | ............. | B60T 8/4045 |
| | | | | 188/1.11 E |
| 5,188,440 A * | 2/1993 | Muller | ................. | B60T 8/4045 |
| | | | | 303/10 |
| 5,197,788 A * | 3/1993 | Fennel | ............... | B60T 8/17616 |
| | | | | 188/181 A |
| 5,281,014 A * | 1/1994 | Volz | ..................... | B60T 8/4059 |
| | | | | 303/10 |
| 5,362,140 A * | 11/1994 | Burgdorf | ................ | B60T 8/348 |
| | | | | 303/113.2 |
| 6,241,323 B1 * | 6/2001 | Wagner | ................ | B60T 8/3275 |
| | | | | 303/113.4 |
| 6,386,648 B1 * | 5/2002 | Wasson | ................ | B60T 11/232 |
| | | | | 303/113.3 |
| 6,554,373 B1 * | 4/2003 | Bill | ...................... | B60T 8/3265 |
| | | | | 303/113.4 |
| 6,851,762 B2 * | 2/2005 | Kamiya | ................ | B60T 8/3275 |
| | | | | 303/113.3 |
| 7,309,112 B2 * | 12/2007 | Isono | ..................... | B60K 6/365 |
| | | | | 303/11 |
| 8,888,197 B2 * | 11/2014 | Miyazaki | ............. | B60T 8/4081 |
| | | | | 303/116.2 |
| 9,522,659 B2 * | 12/2016 | Matsushita | ........... | B60T 8/3275 |
| 2015/0203083 A1 * | 7/2015 | Miyazaki | ................. | B60T 8/36 |
| | | | | 60/545 |

* cited by examiner

ELECTRONICALLY SLIP-CONTROLLABLE POWER-ASSISTED BRAKING SYSTEM, IN PARTICULAR FOR A MOTOR VEHICLE

CROSS REFERENCE

The present application claims the benefit under 35 U.S.C. § 119 of German Patent Application No. DE 102015211430.9 filed on Jun. 22, 2015, which is expressly incorporated herein by reference in its entirety.

FIELD

The present invention relates to an electronically slip-controllable power-assisted braking system, in particular for a motor vehicle.

BACKGROUND INFORMATION

Conventional power-assisted braking systems have a brake master cylinder, actuatable by the driver, having at least one brake circuit connected thereto. The brake master cylinder interacts with a booster device that generates the assisting force, in order to generate a requisite circuit pressure in the brake circuit. Conventional booster devices are so-called vacuum braking force boosters. These generate the assisting force with the aid of negative pressure that is made available in conventional vehicles, for example, from the vehicle drive system or by way of separately provided negative-pressure generators.

Modern motor vehicle drive systems, however, for example electric drive systems, hybrid drive systems, or forced-induction internal combustion engines, now generate little or no negative pressure usable for generation of an assisting force, or do so only occasionally. Negative-pressure generators that are therefore necessary are laborious to prepare, increase the installation space requirement and vehicle weight, and increase outlay for parts and installation.

SUMMARY

Example embodiments of the present invention may have the advantage that a hydraulically effective booster device that is independent of the presence of pneumatic negative pressure in the motor vehicle is now used to generate an assisting force. A vacuum braking force booster, together with its peripherals such as a vacuum pump or pressure lines, can be omitted. A booster device that is the basis of an example embodiments of the present invention is disposed downstream from the brake master cylinder in a brake circuit, and has a piston unit guided movably in a cylinder. That unit divides an interior space of the cylinder into multiple booster chambers that can be impinged upon by brake fluid and are sealed with respect to one another. The pressure level in at least one of these booster chambers is variably adjustable by way of a pump driven by external force. This pump is present in any case in order to regulate the brake pressure in the vehicle braking system.

The booster device accordingly utilizes components of a slip-controlled vehicle braking system and requires only a few specific individual parts, such as the aforementioned piston/cylinder unit. The latter is particularly compact and can be integrated in space-saving fashion into the existing hydraulic unit for modulating the brake pressure of the vehicle braking system. By way of an adapted electronic control application system the assistance made available by the booster device is adjustable as necessary as to magnitude, and adjustable independently of the instantaneous operating state of the vehicle or of its drive system. A feedback of brake actuation to the driver can be influenced by way of the assistance setting.

Further advantages or advantageous refinements of the present invention are evident from the description below.

BRIEF DESCRIPTION OF THE DRAWINGS

An exemplifying embodiment of the invention is depicted in the figures and is explained in detail below.

DETAILED DESCRIPTION OF EXAMPLE EMBODIMENTS

Figure 1:
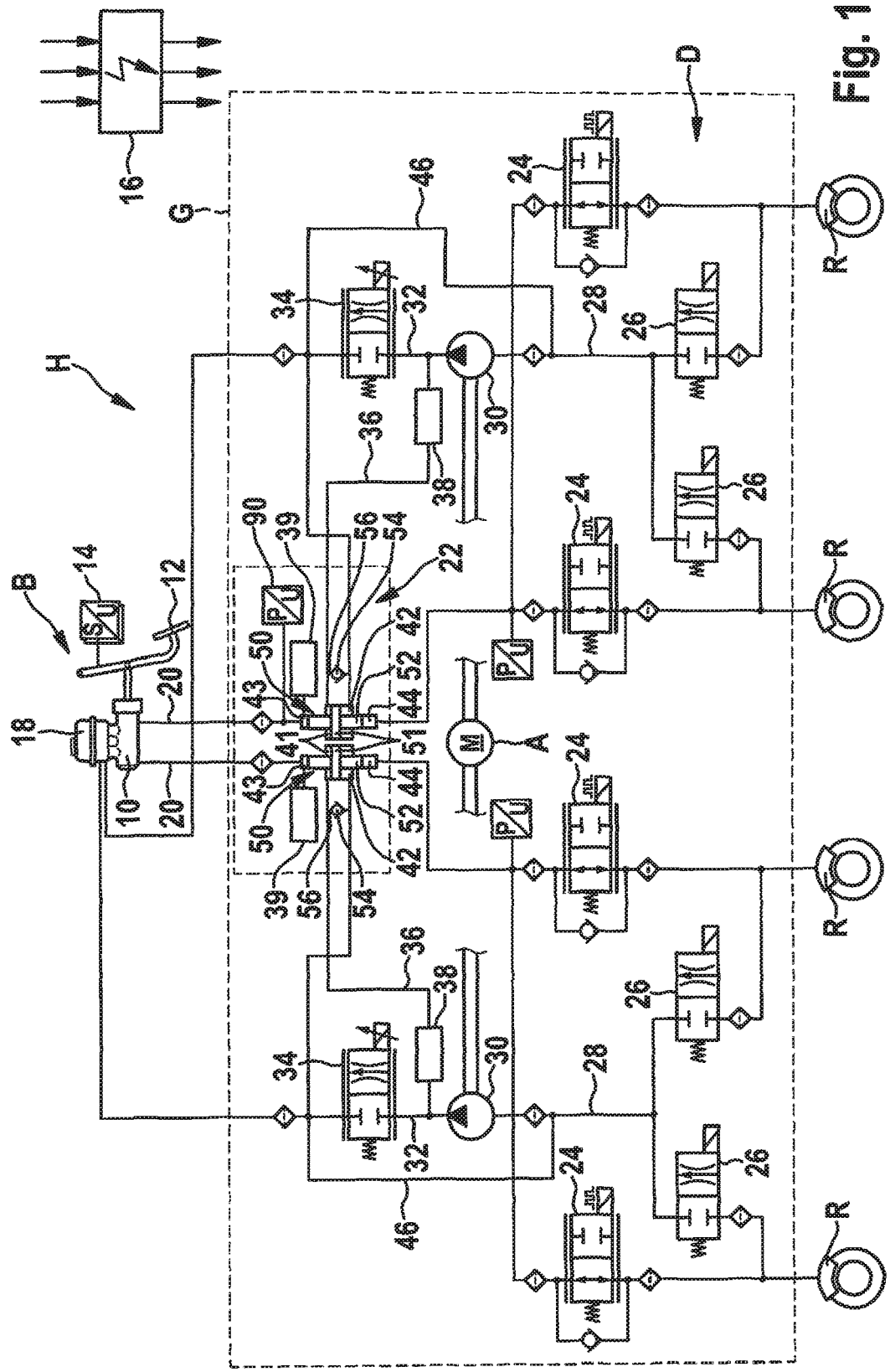
FIG. 1 is a diagram of an electronically slip-controllable power-assisted braking system having an assisting-force source according to the present invention, based on circuit symbols of the components controlling the pressure medium and their connecting lines.

The electronically slip-controllable power-assisted braking system H illustrated in FIG. 1 on the basis of a diagram is subdivided in principle into an actuation device B actuatable by the driver by muscle force, a pressure modulation device D disposed after that actuation device B, and multiple wheel brakes R impinged upon by pressure modulation device D with an adjustable brake pressure. Said brakes are respectively associated with a wheel (not depicted) of a motor vehicle. Actuation device B encompasses a conventional brake master cylinder 10 that is actuatable by the driver via a pedal 12. A pedal travel sensor 14 that is provided converts the pedal travel effected by pedal 12 into a voltage signal and directs it to an electronic control device 16 for evaluation. Coupled to brake master cylinder 10 is a reservoir container 18 from which power-assisted brake system H is supplied with hydraulic pressure medium. By way of example, two brake circuits 20 separated from one another are connected to brake master cylinder 10. Because these brake circuits 20 are configured largely identically to one another, a detailed description of one brake circuit 20 is sufficient.

The relevant brake circuit 20 is fitted according to the present invention with a booster device 22 that is disposed directly after brake master cylinder 10. This booster device 22 has the function within the respective brake circuit 20 of converting a braking request, specified by the driver by way of the pedal actuation, into a circuit pressure, and delivering that circuit pressure to the hydraulically downstream pressure modulation device D. The configuration of booster device 22 will be discussed in further detail at a later point below.

The aforementioned pressure modulation device D is of conventional construction and encompasses several pairs of solenoid valves, one wheel brake R of brake circuit 20 being associated with each solenoid valve pair. Each solenoid valve pair is made up of a pressure buildup valve 24 and a pressure reduction valve 26. Pressure buildup valve 24 is disposed upstream from the wheel brake in brake circuit 20 and controls a pressure medium connection from brake master cylinder 10 to the wheel brake, while pressure reduction valve 26 is located downstream from the wheel brake and controls a return path 28 from the wheel brake to reservoir container 18. Pressure buildup valve 24 is a control valve having two pressure medium connectors, which valve can be transferred by corresponding application of electronic control in any number of intermediate steps from a normally open default position into a blocking position (2/2-way normally open control valve). Pressure reduction valve 26 likewise has two pressure medium connectors but is embodied as a switching valve, and is switched over from a closed default position into a passthrough position (2/2-way normally closed switching valve). Return path 28 controlled by pressure reduction valve 26 is contacted to a suction connector of a return delivery pump 30 associated with the brake circuit. This return delivery pump 30 can be embodied, for example, as a piston pump, as a multiple piston pump, or as a gear pump, and is driven by external power via a drive unit A to which control can be applied via control device 16.

Return delivery pump 30 delivers the pressure medium via a pump outlet into a return line 32 leading to reservoir container 18. Said line is controllable via an electronically controlled outflow valve 34. Outflow valve 34 is embodied as a normally closed control valve that blocks a throttled pressure medium connection between two valve connectors or successively opens it, as a function of its electronic control application.

Branching off from return line 32 between return delivery pump 30 and outflow valve 34 is a supply line 36 through which a booster chamber 41 of booster device 22 is supplied with pressure medium under pump pressure. A first damper volume 38 can optionally be integrated into this supply line 36 in order to damp any pressure pulsations triggered by return delivery pump 30.

A suction pressure line 46 that is likewise contacted to booster device 40 also branches off from the return path directly upstream from a pump inlet of return delivery pump 30. Suction pressure line 46 opens into a booster chamber 42, thereby establishing in that booster chamber 42 the pressure level existing on the suction side of return delivery pump 30. Booster chamber 41 and booster chamber 42 are hydraulically separated from one another by a piston component 51 of a piston unit 50. The pressure difference existing between the suction pressure and discharge pressure of return delivery pump 30 is thus present at the mutually opposite pressure surfaces of this first piston component 51.

Suction pressure line 46 is contacted to return line 32 downstream from outflow valve 34, so that this pressure difference between the suction and discharge pressures of return delivery pump 30 can be established as necessary by corresponding application of electronic control to outflow valve 34.

An equalization line 56 controllable by a check valve 54 is furthermore provided between suction pressure line 46 and supply line 36. Check valve 54 allows flow in the direction from suction pressure line 46 to supply line 36, and blocks it in the opposite direction. Check valve 54 thereby enables an outflow of pressure medium from suction pressure line 46 into supply line 36 if the pressure level in that supply pressure line 36 should be lower than in suction pressure line 46.

Booster device 22 further encompasses a booster chamber 43 that is connected directly to brake master cylinder 10. The pressure level generated by an actuation of brake master cylinder 10 thus exists in booster chamber 43. A second damper volume 39 can optionally be provided between brake master cylinder 10 and booster unit 40 in order to provide good pedal feel upon initial braking or as braking proceeds. The stiffness of the pressure medium volume between pedal 12 and pressure modulation device D can be reduced by way of damper 39.

Located opposite booster chamber 43 in booster unit 22 is a booster chamber 44 that is connected directly to pressure modulation device D or to its pressure reduction valve 24. A piston component 51 separates booster chamber 43 from booster chamber 44.

All the components so far explained, with the exception of brake master cylinder 10, reservoir container 18, and wheel brakes R, are integrated together into a housing block G as depicted symbolically by the dashed outline in FIG. 1. Housing blocks not having an integrated booster device are available in conventional slip-controlled vehicle braking systems in which the housing block constitutes the core of the hydraulic units used therein. Hydraulic units are made up of housing block G, electronic control device 16 attached thereto, and (also attached) drive unit A for return delivery pumps 30. Housing block G accommodates, inter alia, solenoid valves 24, 26 necessary for slip control, damper elements 38, 39, and return delivery pumps 30, no claim being made that this list is complete.

Figure 2:
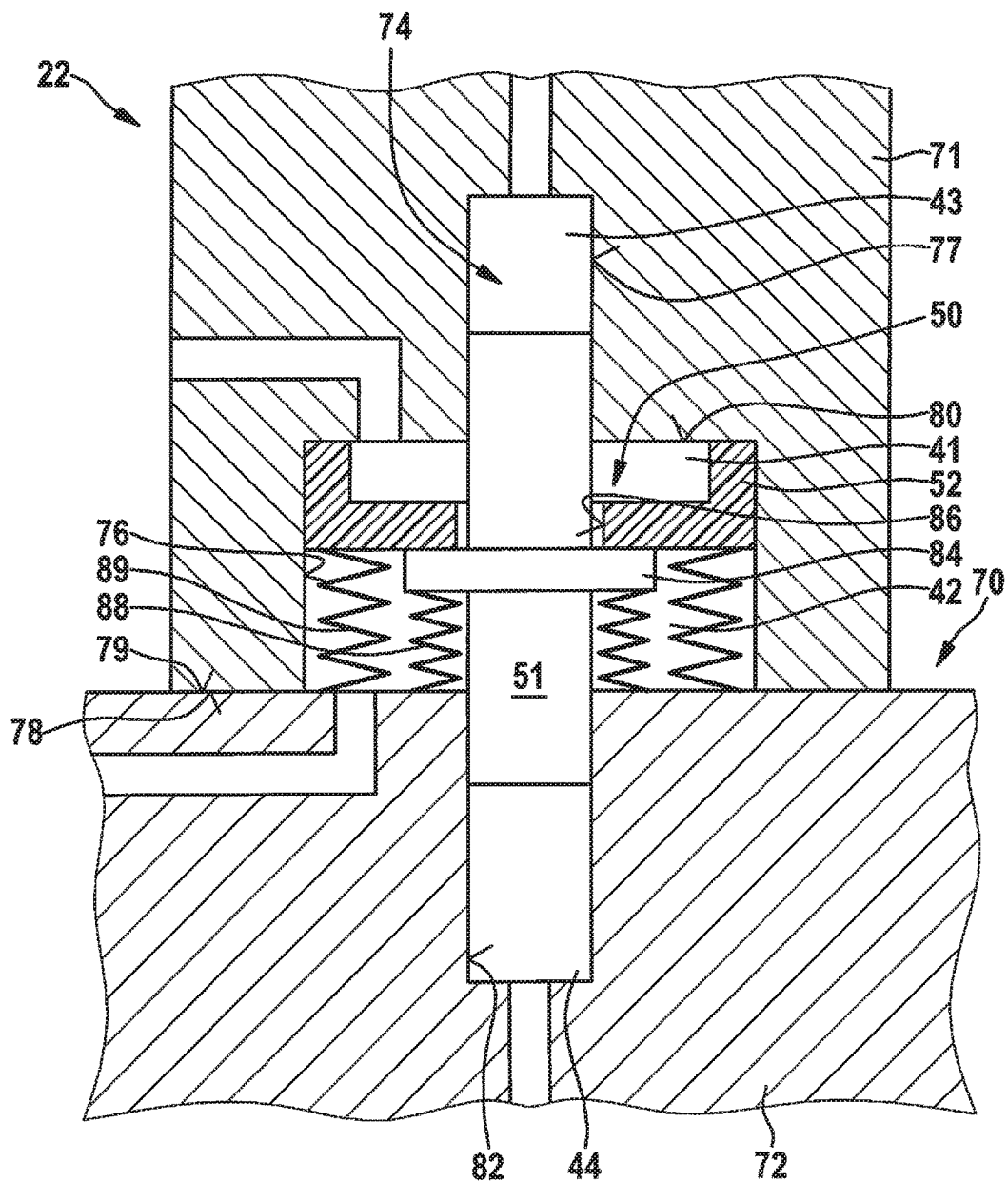
FIG. 2 is a detail view of a booster device on which an example embodiment of the present invention is based.

FIG. 2 is a detailed view of the construction of booster device 22. This booster unit 22 has a split cylinder housing 70 made up of two housing halves 71 and 72 connected to one another. The latter enclose between them a shared interior space 74 in which piston unit 50 is movably received. A stepped orifice made up of two mutually concentrically disposed orifice segments 76; 77 having different inside diameters is embodied in first housing half 71 in order to implement interior space 74. Orifice segment 76, having a larger inside diameter, proceeds from a flange surface 78 with which first housing half 71 sealingly abuts against an oppositely located second flange surface 79 of second housing half 72. Adjoining this first orifice segment 76 in the direction of the interior of first housing half 71 is a second orifice segment 77 having a smaller inside diameter. The transition between the two orifice segments 76, 77 of first housing half 71 is embodied as a right-angle step 80.

Second housing half 72, conversely, is equipped with only one orifice 82 whose inside diameter corresponds, for example, to the inside diameter of the smaller second orifice segment 77 of first housing half 71. With cylinder housing 70 in the assembled state, the longitudinal axes of orifice segments 76, 77 of first housing half align with the longitudinal axis of orifice 82 of second housing half 72, so that the entire interior space 74 encompasses a cylindrical cross section having a center segment whose inside diameter is widened.

Piston unit 50 constructed from first piston component 51 and from second piston component 52 is received, axially displaceably in the direction of its longitudinal axis, in this interior space 74. First piston component 51 is constituted by a cylindrical piston that passes through the center segment of interior space 74 and penetrates with its oppositely located ends into the segments of interior space 74 having a smaller inside diameter and is thus radially sealingly guided. The mutually oppositely located end surfaces at the ends of first piston component 51 delimit boost chambers 43 and 44 of boost device 22.

Embodied at that region of piston component 51 which passes through the center segment of interior space 74 is a radially protruding collar 84 that is embodied, by way of example, circumferentially. This forms an entraining element for piston element 52, which is embodied in the form of an annular piston. The dimensions of this piston component 52 are selected in such a way that piston component 52 abuts with its outer periphery sealingly against the wall of the larger-diameter center segment of interior space 74. In addition, a recess 86 in the center of the annular piston is matched in terms of its inside diameter to the outside diameter of piston component 51 in such a way that the two piston components 51 and 52 are disposed sealedly with respect to one another but movably relative to one another. As shown in FIG. 2, second piston element 52 is disposed above collar 84 of piston element 51 and separates, in pressure-medium-tight fashion, booster chamber 41 connected to return delivery pump 30 from booster chamber 42 contacted to reservoir container 18. According to FIG. 2 the pressure level existing in booster chamber 41 impinges upon an upper side of annular piston component 52, while the pressure level in booster chamber 42 acts on a lower side of that piston element 52. Booster chamber 41 and booster chamber 42 thus form annular chambers that are delimited in a radial direction by the circumferential wall of the center segment of interior space 74 and by the circumferential surface of first piston component 51.

Both piston component 51 and piston component 52 of piston unit 50 are respectively impinged upon by an elastic piston return element 88, 89. These piston return elements 88, 89 return piston components 51, 52 mutually independently to their default positions. In the exemplifying embodiment they are embodied as helical springs disposed inside one another. The internally located piston return element 88 is braced between flange surface 79 of second housing half 72 and the facing side of collar 84 of first piston component 51, while conversely the externally located piston return element 89 is braced between second flange surface 79 of second housing half 72 and a segment of second piston component 52 which projects radially with respect to collar 84 of first piston component 51.

Each of booster chambers 41 to 44 is impinged upon by hydraulic pressure medium and is isolated with respect to the other booster chambers 41 to 44. Different hydraulic pressures nevertheless exist in booster chambers 41 to 44. Booster chamber 41 is connected to the pump output of return delivery pump 30 driven by external power; booster chamber 42 located oppositely thereto is connected to reservoir container 18; booster chamber 43 is in communication with brake master cylinder 10; and booster chamber 44 located opposite booster chamber 43 is coupled indirectly to a wheel brake R via pressure buildup valve 24 of pressure modulation device D. The pump delivery pressure supplied by the driven return delivery pump 30 is accordingly present in booster chamber 41; booster chamber 42 is pressureless or is impinged upon by atmospheric pressure; and the pressure level generated by the driver by the actuation of brake master cylinder 10 exists in booster chamber 43.

Pedal travel sensor 14 detects an actuation of brake master cylinder 10 and conveys a corresponding voltage signal to electronic control device 16 for evaluation. The latter, together with the information of a pressure sensor 90 sensing the master cylinder pressure in the brake circuit, thereupon applies control as necessary to return delivery pump 30, which consequently impinges upon booster chamber 41 with pump pressure. As a result of the pump pressure, piston component 52 moves against the force of its associated piston return element 89 downward in FIG. 1 and abuts, with its underside facing toward collar 84, against that collar 84 of piston component 51. The mechanical coupling of piston components 51 and 52 which is thereby established causes the pump pressure force impinging upon piston component 52 to be transferred to piston component 51. The latter is in turn simultaneously impinged upon by a brake master cylinder pressure force as a result of the brake master cylinder pressure of third booster chamber 43. The pressure forces add up, and piston unit 50 moves downward in FIG. 2 against the return force of the associated piston return elements 88, 89. The volume of booster chamber 44 thereby decreases, and the pressure level in that booster chamber 44 rises accordingly to a value that is higher than the brake master cylinder pressure in booster chamber 43. The brake master cylinder pressure is thus boosted on the basis of the proposed booster device 22, the boost ratio being variably adjustable by varying the pump pressure by corresponding application of control to drive unit A of return delivery pump 30.

Upon release of pedal 12, outflow valve 34 has control electronically applied to it and thus creates a throttled pressure medium connection between booster chamber 41 and reservoir container 18, through which the pressure medium contained in booster chamber 41 flows out and the pressure thus decreases.

Pressure sensors 90 that are additionally present enable an improvement in pressure regulation and/or in the monitoring of brake pressures in the respectively associated brake circuits 20.

Return delivery pump 30 and thus boost device 22 are non-functional in the event of a vehicle electrical system failure. To enable the driver nevertheless to generate brake pressure by muscle-power actuation of brake master cylinder 10, check valve 54 between suction pressure line 46 and supply line 36 of return delivery pump 30 enables pressure equalization between the pressure in reservoir container 18 and the pressure in booster chamber 41.

Modifications or additions to the exemplifying embodiment that has been described are of course possible without deviating from the fundamental idea of the present invention.

What is claimed is:

1. An electronically slip-controllable power-assisted braking system for a motor vehicle, comprising:
   an actuation device capable of being impinged upon by muscle force;
   a booster device configured to interact with the actuation device for generation of a circuit pressure in at least one brake circuit connected to the actuation device;
   a pressure modulation device capable of having control applied electronically to it and provided in the brake circuit, for converting the circuit pressure into a brake pressure as a function of slip conditions existing at a wheel of a vehicle equipped with the power-assisted braking system; and
   at least one wheel brake connected to the brake circuit, the at least one wheel brake being associated with the wheel of the vehicle and converting the brake pressure into a wheel braking force;
   wherein:
      the booster device is arranged in the brake circuit downstream from the actuation device;
      the booster device includes:
         (a) a cylinder housing that defines an interior space within the cylinder housing; and
         (b) a piston unit that is guidable movably within the interior space of the cylinder housing and that divides the interior space into a plurality of booster chambers sealed from each other;
      the plurality of booster chambers includes a first booster chamber that is connected to a discharge side of a pump that is drivable by external power for obtaining from the pump a pressure medium under discharge pressure of the pump; and
      at least one of:

the plurality of booster chambers includes a second booster chamber that is fluidically connected to a suction side of the pump for obtaining from a line in which the pump is arranged pressure medium that is under suction pressure of the pump;

the plurality of booster chambers includes a third booster chamber (a) that is located beyond a first longitudinal end face of the piston unit so that the first longitudinal end face of the piston unit is a wall of the third booster chamber and (b) that is perpetually fluidically sealed within the cylinder housing from the first booster chamber and from which pressure medium is suppliable from the interior space of the booster device to the at least one wheel brake, with the first booster chamber, when connected to the discharge side of the pump, being entirely formed around, and radially exterior to, a mid-section of the piston unit that is between the first longitudinal end face of the piston unit and a second longitudinal end face of the piston unit, which is opposite the first longitudinal end face;

the plurality of booster chambers includes at least three chambers that are each perpetually fluidically sealed within the cylinder housing from each of the others of the at least three chambers, the piston device including a piston element that divides the interior space into the at least three chambers and that is movable only in its entirety; and the pump is arranged in a return line so that pressure medium is returnable, via the pump, from the at least one wheel brake to a pressure medium reservoir for feeding of pressure medium from the at least one wheel brake.

2. The electronically slip-controllable power-assisted braking system as recited in claim 1, wherein the plurality of booster chambers includes a fourth booster chamber that is connected to the actuation device of the power-assisted braking system, and the plurality of booster chambers includes the third booster chamber, which is contacted to the pressure modulation device.

3. The electronically slip-controllable power-assisted braking system as recited in claim 2, wherein the plurality of booster chambers includes the second booster chamber, the first booster chamber is located opposite the second booster chamber, and the fourth booster chamber is connected located opposite the third booster chamber.

4. The electronically slip-controllable power-assisted braking system as recited in claim 2, wherein the pressure in the third booster chamber is variably adjustable via an adaptation of the pressure impingement upon the fourth booster chamber and upon the first booster chamber.

5. The electronically slip-controllable power-assisted braking system as recited in claim 1, wherein the piston unit is constructed from at least two mutually interacting piston components having outside diameters of different sizes, the piston components being disposed movably relative to one another in the interior space of the cylinder housing.

6. The electronically slip-controllable power-assisted braking system as recited in claim 5, wherein the piston components respectively separate two mutually oppositely located booster chambers of the booster unit from one another.

7. The electronically slip-controllable power-assisted braking system as recited in claim 5, wherein the piston components are mechanically couplable in order to transfer a pressure force from one of the piston components to the respective other one of the piston components.

8. The electronically slip-controllable power-assisted braking system as recited in claim 5, wherein one of the piston components is a cylindrical piston and another of the piston components is an annular piston, an entraining element for the annular piston being embodied on the cylindrical piston.

9. The electronically slip-controllable power-assisted braking system as recited in claim 8, wherein the entraining element is embodied in the form of a collar protruding radially from the cylindrical piston.

10. The electronically slip-controllable power-assisted braking system as recited in claim 5, wherein one of the piston components is slidable within another of the piston components.

11. The electronically slip-controllable power-assisted braking system as recited in claim 1, wherein a throttled pressure medium connection, which is controllable by an outflow valve capable of having electronic control applied to it, exists between the discharge side and the suction side of the pump.

12. The electronically slip-controllable power-assisted braking system as recited in claim 1, wherein the plurality of booster chambers includes the second booster chamber that is fluidically connected to the suction side of the pump for obtaining from the line in which the pump is arranged pressure medium that is under suction pressure of the pump.

13. The electronically slip-controllable power-assisted braking system as recited in claim 1, wherein the plurality of booster chambers includes the third booster chamber (a) that is located beyond the first longitudinal end face of the piston unit so that the first longitudinal end face of the piston unit is the wall of the third booster chamber and (b) that is perpetually fluidically sealed from the first booster chamber and from which pressure medium is suppliable from the interior space of the booster device to the at least one wheel brake, with the first booster chamber being formed around, and radially exterior to, a mid-section of the piston unit that is between the first longitudinal end face of the piston unit and a second longitudinal end face of the piston unit, which is opposite the first longitudinal end face.

14. The electronically slip-controllable power-assisted braking system as recited in claim 1, wherein the plurality of booster chambers includes the at least three chambers that are each perpetually fluidically sealed within the cylinder housing from each of the others of the at least three chambers, the piston device including the piston element that divides the interior space into the at least three chambers and that is movable only in its entirety.

15. The electronically slip-controllable power-assisted braking system as recited in claim 1, wherein the plurality of booster chambers includes four chambers that are each arranged for receiving pressure medium.

16. The electronically slip-controllable power-assisted braking system as recited in claim 1, wherein the pump is arranged in the return line so that pressure medium is returnable, via the pump, from the at least one wheel brake to the pressure medium reservoir for feeding of pressure medium from the at least one wheel brake.

17. The electronically slip-controllable power-assisted braking system as recited in claim 16, wherein the pump is arranged so that the pressure medium is returnable from the at least one wheel brake to the pressure medium reservoir without passing through the booster device.

18. The electronically slip-controllable power-assisted braking system as recited in claim 16, further comprising a master cylinder downstream of the actuation device and upstream of the booster device, wherein the pump is arranged so that the pressure medium is returnable from the at least one wheel brake to the pressure medium reservoir without passing through the booster device.

19. The electronically slip-controllable power-assisted braking system as recited in claim 1, further comprising a master cylinder downstream of the actuation device and upstream of the booster device.

20. The electronically slip-controllable power-assisted braking system as recited in claim 19, wherein the plurality of booster chambers includes at least four booster chambers.

21. The electronically slip-controllable power-assisted braking system as recited in claim 1, wherein one of the plurality of booster chambers is arranged beyond the first longitudinal end face of the piston unit, another of the plurality of booster chambers is arranged beyond the second longitudinal end face of the piston unit, and two others of the plurality of booster chambers are arranged around, and radially exterior to, the mid-section of the piston unit, between the chambers arranged beyond the first and second longitudinal end faces, respectively.

22. The electronically slip-controllable power-assisted braking system as recited in claim 1, wherein the first booster chamber, when connected to the discharge side of the pump, is entirely formed around, and radially exterior to, the mid-section of the piston unit between the first and second longitudinal end faces of the piston unit.

* * * * *